(12) United States Patent
Lites

(10) Patent No.: US 7,805,359 B2
(45) Date of Patent: Sep. 28, 2010

(54) SECURITIZATION OF A COMMERCIAL TRANSACTION

(75) Inventor: Barry Lites, Huntington, NY (US)

(73) Assignee: TradeCard, Inc., New York, NY (US)

( * ) Notice: Subject to any disclaimer, the term of this patent is extended or adjusted under 35 U.S.C. 154(b) by 526 days.

(21) Appl. No.: 11/541,135

(22) Filed: Sep. 28, 2006

(65) Prior Publication Data
US 2007/0156572 A1 Jul. 5, 2007

Related U.S. Application Data

(60) Provisional application No. 60/721,749, filed on Sep. 28, 2005.

(51) Int. Cl.
*G06Q 40/00* (2006.01)
(52) U.S. Cl. .......................................... 705/37; 705/38
(58) Field of Classification Search ............. 705/37–38, 705/39
See application file for complete search history.

(56) References Cited

U.S. PATENT DOCUMENTS

| | | | |
|---|---|---|---|
| 4,799,156 A | 1/1989 | Shavit et al. |
| 5,359,509 A | 10/1994 | Little et al. |
| 5,644,727 A | 7/1997 | Atkins |
| 5,704,044 A | 12/1997 | Tarter et al. |
| 5,717,989 A | 2/1998 | Tozzoli et al. |
| 5,732,400 A | 3/1998 | Mandler et al. |
| 5,842,178 A | 11/1998 | Giovannoli et al. |
| 5,870,711 A | 2/1999 | Huffman |
| 5,875,437 A | 2/1999 | Atkins |
| 5,970,470 A | 10/1999 | Walker et al. |
| 6,035,208 A | 3/2000 | Osawa |
| 6,035,288 A | 3/2000 | Solomon |
| 6,055,514 A | 4/2000 | Wren |
| 6,058,378 A | 5/2000 | Clark |
| 6,073,116 A | 6/2000 | Boyle |
| 6,115,690 A | 9/2000 | Wong |

(Continued)

FOREIGN PATENT DOCUMENTS

WO    WO 96/12242    4/1996

(Continued)

OTHER PUBLICATIONS

Watterson, P., Stein, C. and Boggiano, K., "Credit default swaps on asset-backed securities," Credit [online], Nov. 2002 [retrieved Mar. 28, 2007]; retrieved from the internet: URL: <http://www.srz.xom/files/article-november02-creditefaultswaps.pdf>.

(Continued)

*Primary Examiner*—Thu Thao Havan
(74) *Attorney, Agent, or Firm*—Townsend and Townsend and Crew LLP

(57) ABSTRACT

A method and apparatus for generating a tradable security includes confirming a vendor's compliance with predefined terms of a commercial transaction, such that a buyer is obligated to make a due payment. The method and apparatus further includes electronically rating a financial commitment relating to a receivable account for the commercial transaction. This receivable account is rated based on conditions and factors known to a system facilitating the commercial transaction. Based on the ability for the financial commitment to be rated, a financial exchange is operative to transfer entitlement rights to monies due under the receivable account where the terms for the transfer of the entitlement rights are based at least in part on the electronic rating. Thereby, receivable accounts to commercial transactions may be tradable by one or more investors as properly rated investment.

29 Claims, 2 Drawing Sheets

U.S. PATENT DOCUMENTS

| | | | |
|---|---|---|---|
| 6,128,602 A | 10/2000 | Northington | |
| 6,141,653 A | 10/2000 | Conklin et al. | |
| 6,151,588 A | 11/2000 | Tozzoli et al. | |
| 6,167,385 A | 12/2000 | Hartley-Urquhart | |
| 6,192,354 B1 | 2/2001 | Bigus et al. | |
| 6,216,115 B1 | 4/2001 | Barrameda et al. | |
| 6,219,653 B1 | 4/2001 | Bigus et al. | |
| 6,240,396 B1 | 5/2001 | Walker et al. | |
| 6,351,738 B1 | 2/2002 | Clark | |
| 6,351,739 B1 | 2/2002 | Egendorf | |
| 6,360,211 B1 | 3/2002 | Anderson et al. | |
| 6,739,517 B1 | 5/2004 | Krueger | |
| 7,047,219 B1 | 5/2006 | Martin et al. | |
| 7,069,234 B1 | 6/2006 | Cornelius et al. | |
| 2002/0095373 A1 | 7/2002 | Melchior et al. | |
| 2002/0099655 A1 | 7/2002 | Melchior et al. | |
| 2002/0107785 A1 | 8/2002 | Melchior et al. | |
| 2002/0120555 A1 | 8/2002 | Lerner | |
| 2002/0156656 A1 | 10/2002 | Harrell et al. | |
| 2004/0019548 A1* | 1/2004 | Hu et al. | 705/36 |
| 2004/0122763 A1* | 6/2004 | Wang | 705/39 |
| 2005/0222940 A1* | 10/2005 | Schulman | 705/37 |
| 2008/0319808 A1* | 12/2008 | Wofford et al. | 705/6 |

FOREIGN PATENT DOCUMENTS

| | | |
|---|---|---|
| WO | WO 00/48053 | 8/2000 |
| WO | WO 00/55774 | 9/2000 |
| WO | WO 00/70519 | 11/2000 |
| WO | WO 01/33220 | 5/2001 |
| WO | WO 01/35286 | 5/2001 |
| WO | WO 01/41096 | 6/2001 |
| WO | WO 01/75644 | 10/2001 |
| WO | WO 02/33514 | 4/2002 |

OTHER PUBLICATIONS

Willkie Farr & Gallagher, LLP, Tradecard's Memorandum In Support of Its Motion For Judgement as a Matter of Law, Apr. 26, 2006, Civil Action No. 03-CIV-1468 (AKH), 58 pgs.

King & Spalding, LLP, Defendants' Opposition To Tradecard's Motion For Judgement as a Matter of Law, May 30, 2006, Civil Action No. 03-CIV-1468 (AKH), 102 pgs.

Willkie Farr & Gallagher, LLP, Tradecard's Reply Memorandum In Support of Its Motion for Judgment as a Matter of Law, Jun. 15, 2006, Civil Action No. 03-CIV-1468 (AKH), 34 pgs.

Alvin K. Hellerstein, Opinion and Order Denying Motions For a New Trial and For Judgement as a Matter of Law, Sep. 6, 2007, Civil Action No. 03-CIV-1468 (AKH), 46 pgs.

Mohamad, Packeer, "Examining Cash-Flow Forecasts," New Straits Times, Kuala Lumpur, Dec. 10, 1996. 5 pages.

Leonard, Adrian, Internet Services Offered at Lloyd's [5th edition], Nov. 4, 1998, Journal of Commerce, p. 11A.

Ternef, Barry A., "Safeguarding Shipments When Going Global," Sep. 1993, Risk Management, vol. 40, Issue 9, pp. 20-26.

Mohamad, Packeer, "*Examining cash-flow forecasts*," New Straits Times, Kuala Lumpur, Dec. 10, 1995, 5pgs.

Leonard, Adrian, "*Internal services offered at Lloyd's*," Journal of Commerce, Nov. 4, 1998, p. 11A.

Ternef, Barry, A., "*Safeguarding shipments when going global*," Risk Management. Sep. 1993, vol. 40, Issue 9, pp. 20-26.

* cited by examiner

SECURITIZATION OF A COMMERCIAL TRANSACTION

RELATED APPLICATIONS

The present application relates to and claims priority to Provisional Application Ser. No. 60/721,749 entitled "Securitization of a Commercial Transaction" having a filing and priority date of Sep. 28, 2005.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

The present invention relates generally to the management of commercial transactions and financial obligations that arise from those commercial transactions and more specifically to the generation of investment vehicles for trade-related financial obligations.

As commerce continues to grow and expand globally, commercial transactions have become increasingly complex. When dealing with manufacturing contracts, for example, typical problems may arise in respect of the original contract terms themselves; financial terms associated with such contracts; manufacturing and delivery concerns associated with such contracts; as well as with many other areas.

One common problem in commercial transactions involves financing the transaction itself. Previously, letters of credit were used as both the payment vehicle for a trade transaction and credit-enhancement for trade finance purposes. Finance proceeds were typically used to invest in materials and labor to fulfill the order. Letters of credit follow strict and precise guidelines, as typically dictated by the lending institutions issuing the letters of credit. Problems can easily arise in intricate commercial transactions between manufacturers and buyers, delaying and complicating payment to the manufacturer or its financing bank.

Full Service Trade Systems and improvements thereon are described in U.S. Pat. No. 5,717,989, issued on Feb. 10, 1998; U.S. Pat. No. 6,151,588, issued on Nov. 21, 2000; U.S. patent application Ser. No. 09/981,616 filed on Oct. 16, 2001; U.S. patent application Ser. No. 09/981,637 filed on Oct. 16, 2001; U.S. patent application Ser. No. 09/981,645 filed on Oct. 16, 2001; U.S. patent application Ser. No. 09/981,642 filed on Oct. 16, 2001; and Patent Cooperation Treaty International Application No. PCT/US01/32379, filed on Oct. 16, 2001 and published as W.I.P.O. Publication No. WO 02/33514, collectively referred to as "Related Patents and Applications".) The Related Patents and Applications are herein incorporated by reference in each of its entirety.

As disclosed in the related patents and applications, through the central transaction system, any number of parties can accurately and quickly monitor the status of the transaction. Also, through this system, payments may be electronically monitored based on satisfaction of certain conditions. This commercial transaction control system can coordinate with financial institutions to not only supplant letters of credit, but also provide means for paying parties at specified dates. For example, completed invoices are typically paid at a net day period, such as 30 days net or 60 days net. Therefore, even though the transaction is completed, the buyer's financial obligations are not transmitted to the vendor until this period of time has expired.

In existing commercial transactions, net payment dates typically reflect the period of time during which the buyer processes an invoice. It is typical that the invoice is verified by a receiving department and then forwarded to an accounts payable department. This accounts payable department must process the invoice, confirm everything is in proper order and then authorize the payment. In paper-based transactions, this can be a slow and time consuming process, especially with high volume buyers that handle significant numbers of shipments/invoices.

Therefore, the net payment date is typically included or understood in the contract between the buyer and vendor. Although, with the electronic trade platform, the delay period for payment is not as important. As the invoices can be verified in real time, steps associated with the accounts payable department can be avoided. Although, these contract terms still include these delay periods.

The typical commercial contract is negotiated based on these net terms. For example, the vendor may offer a lower price with a net-30 day payment period compared with a net-90 day payment period.

The payment period may also be reflective of the buyer's creditworthiness. If a buyer may not be as creditworthy, the vendor may require a 15 day net or other short term net to help hedge against potential losses of missed or incomplete payments. For example, if the buyer has several outstanding invoices with short term nets, the vendor may be able to refuse future transactions until the invoices are paid in full. But with an extended net period, the vendor may not be able to demand early payment in full without incurring further obligations such as by taking on more contracts.

With financial obligations having delayed payment periods, these receivable accounts can be classified as short-term loans. The payment obligation is triggered by a vendor's event, such as shipping of goods or receipt by the buyer. The buyer is then both in receipt of the vendor's goods and now the vendor's money, with the vendor holding a note with a bank-authorized commitment. As the vendor waits the net payment period, these financial obligations may be controlled by the buyer's financial institution or a third party escrow account.

Current systems do not provide for investment or financial options with respect to these outstanding notes. One current existing system for trading financial instruments is the securitization and trading of mortgages. These accounts are bundled based on selected criteria and then are able to traded in open markets as security instruments. Mortgage-backed securities provide for long-term investment options based on the long term nature of the underlying mortgage loan itself.

Although, there currently does not exist a system allowing for the securitization and/or trading of short term financial obligations and/or accounts receivables relating to commercial transactions. A significant short-coming in trade debt instruments is the reliability (e.g. creditworthiness) of the parties to the transaction. The market participants do not have enough information to reliably trade debt instruments unless they include a defined standardization, such as with mortgage-backed securities. Such standardization does not exist with many other debt instruments to support open-market trading.

DESCRIPTION OF THE INVENTION

In an electronic trading system, financial commitments associated with one or more credit products extended by credit providers may be converted to a tradable security. The trading system provides for the establishment of business contracts relating to goods or services. In those agreements, payment terms may be supplemented by credit from one or more credit providers. A vendor may acquire credit protection from a credit protection syndicate and a buyer may use a line of credit from the credit protection syndicate.

Through the trading system platform, the agreement may be completed and the vendor thereupon begins fulfilling the contract, for example manufacturing goods to be delivered to the buyer. Before delivery of the goods, the buyer uses its line of credit to secure eventual payment to the vendor and the vendor uses the credit protection to protect against the buyer's default. Once the commercial invoice is delivered to the buyer or the goods are shipped, or some other step in the agreement that triggers payment due to the vendor, the vendor has an account receivable, which is an outstanding debt with contractual obligations for payment by the buyer. With information from the trade system, as well as other information, this credit-enhanced debt may be rated using a standardized rating metric.

Using a trade receivable securitization special purpose vehicle (SPV), the trade receivable SPV can purchase the account receivable, which is the prospective debt payable upon the defined period of time. Similar debts may be grouped together into a collective pool of debt. This pool of debt may then be traded in a market exchange with one or more investors.

The vendor's transfer of the account receivable to the SPV may include a transfer of the related credit protection. Thereupon, when the buyer or a credit provider provides timely payment through the electronic trading system, the SPV receives the payment. The SPV purchases the debt at a reduced price based on metric associated with the debt and a time period before payment is due from the buyer. The vendor receives a reduced payment earlier in time. The SPV thereupon receives full payment at a later time, thereby generating a profit based on the difference between the reduced price and the payment full.

Figure 1:
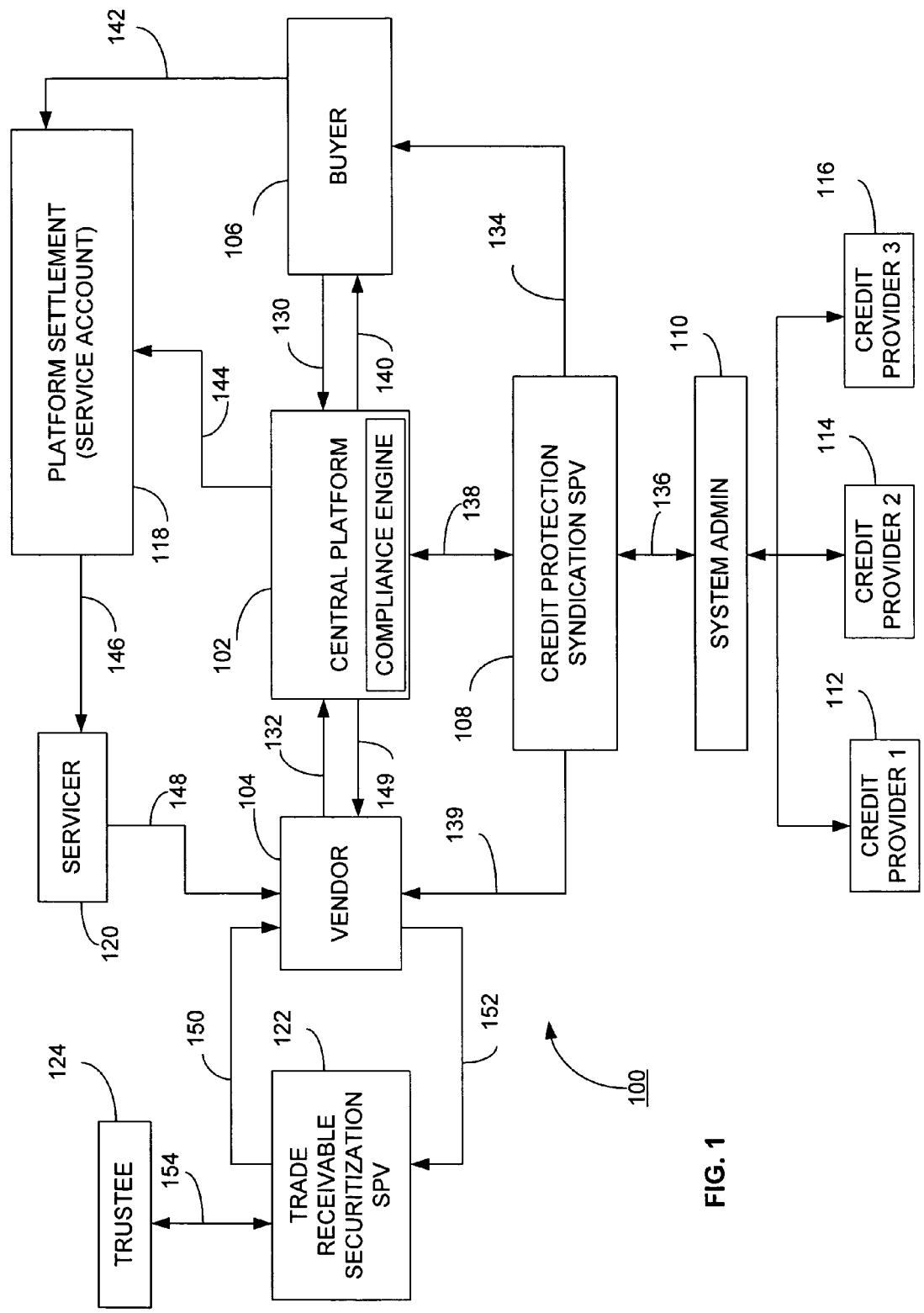
FIG. 1 illustrates a block diagram of one embodiment of an apparatus for generating a tradable security.

FIG. 1 illustrates one embodiment of a system for allowing investment transactions with financial commitments. The system 100 includes a central trading platform 102, a vendor 104, a buyer 106, a credit protection SPV 108, system administrator 110 and credit providers 112, 114 and 116 (collectively referred to as 112-116). The system further includes a platform settlement device 118, a servicing device 120, a trade receivable securitization SPV 122 and a trustee 124. The system may also be referred to as a financial exchange.

The central platform 102 may be a similar to the trading system described in the related patents, including further enhancements as described herein. The vendor 104 and buyer 106 are parties to the transaction, typically accessing the platform 102 using a secure networked connection. The credit protection syndicate SPV 108 may be a processing device for controlling and coordinating credit and credit protection for the buyer 106 and vendor 104, in combination with the activities in the central platform 102. The system administrator 110 facilitates communication between the credit providers 112-116 which may be any suitable facility providing credit, such as a bank or other financial establishment.

The platform settlement device 118 clears the financial aspects to transactions between the buyer 106 and vendor 104 through the central platform 102. Typically, the settlement device 118 is a financial institution that acts as a clearinghouse coordinating payments. A servicing device 120 coordinates payments and provides payments to the vendor 104 when directed.

The trade receivable securitization SPV 122 may be a processing device providing for coordinating the acquisition of debts from the vendor and interacting with trustees 124 for managing money and payments therebetween.

In the system 100, the buyer 106 generates a purchase order 130 and provides the order 130 to the central platform 102. The vendor 104, through accessing the platform 102, provides an approval 132 if the vendor 104 agrees to the terms of the purchase order 130 and other factors, such as factors relating to the buyer's creditworthiness.

The buyer 106 has a line of credit 134 that is provided from the credit protection syndication 108. This line of credit is extended at defined terms from the one or more of the credit providers 112-116 through the system administrator 110, providing a pool of available credit 136 to the syndication 108. The syndication 108 communicates 138 with the platform 102 for managing the credit line and reporting potential credit exposures for parties. The vendor 104 may also purchase credit protection 139 to insure against the buyer's 106 failure to pay.

As the central platform 102 monitors the transactions, at some point payment will be due to the vendor 104. In the central platform 102, a compliance engine, which may be a functional component implemented through executable instructions performed on the processing components of the central platform 102, inspects the terms of the commercial transaction for compliance. Under the electronic management of the commercial transaction, the buyer 106 and vendor 104 interact through the platform 102, therefore in conjunction with full knowledge of the completed activities by parties to the transaction, the platform 102 can accurately determine if the vendor has complied with the terms of the commercial transaction, and therefore the buyer 106 would be obligated to make the proper payment to the vendor 104. For example, if payment is due upon shipment of goods, the buyer 106 may be instructed 140 to make a payment 142, such as using a push-fund wire transfer or a reverse wire debit to the platform settlement device 118. The settlement device 118 may also receive a debit/credit instruction 144 from the central platform 102 including directions for processing payments due to vendor 104.

Although, it is noted that the typical agreement between the buyer 106 and vendor 104 includes a net-term indicating that payment is not due for a defined period time, for example 30 days, 45 days or 60 days. Therefore, the timing of this payment processing by the settlement device 118 may be delayed to reflect this net payment term, whereas the compliance engine of the central platform confirms that a future payment is properly due by buyer's compliance with the terms of the commercial transaction.

The settlement device 118 thereupon may direct a financial transfer 146 to the servicer 120. In one embodiment the servicer 120 monitors transactions and manages payments between vendors and buyers. Therefore, as of compliance by the vendor 104 and the passage of the net-term time period, a payment 148 is provided to the vendor 104. The platform 102 may also provide a payment notification 149 to the vendor 104.

Although, prior to the payment due date, the vendor 104 may transfer or sell rights under the receivable account. For a purchase price 150, the trade receivable securitization SPV 122 may purchase the receivable account. Similarly, securitization SPV 122 may offer a commitment to purchase receivables as of the vendor's 104 compliance.

The securitization SPV 122 may be one or more processing devices that, using data regarding the buyer 106, including a buyer's debt load, line of credit, creditworthiness and other information and terms of the agreement, standardizes the debt load and generates security based tradables for the outstanding account receivables. The SPV 122 may use a general formula based on various factors to create the standardized classification of the debt such that this process may repeated for any number of debts. Debts using this general classification, may then be traded as securities through the SPV 122. This trading of debt securities includes classifications based on information available from the platform 102 and the credit protection syndicate 108.

The SPV 122 may operate in conjunction with any number of vendors using the trade platform 102. The SPV 122 thereupon acquires numerous debt instruments for the different vendors. Once standardized, these debt instruments may be collectively pooled and sold as securities.

In conjunction with a commitment to purchase a receivable account, the vendor 104 may assign any credit protection 152 that the vendor 104 has obtained from the credit protection syndication 108. Therefore, the trade receivable securitization SPV 122 includes any available credit protection, which may be reflected not only in the purchase price of the receivable account, but also in the price that the SPV 122 sells the security to investors.

In the system 100, one or more trustees 124 access 154 the securitization SPV 122 for purchasing the securities. The SPV 122 groups similarly-rated receivable accounts and can sell them to the trustee 124. The trustee 124 may be an administrator controlling the financial commitments of investors and performing operations relating to further advancements of the interest of the investors and committed financial resources.

The receivable accounts may be purchased at reduced prices relating to payment prior to the net term of the agreement. The vendor receives a reduced payment and investors, who assume the risk of payment by the buyer, realize a return on their investment when the payment is provided. Similarly, through the information from the central platform, the receivable accounts may be more accurately rated to reflect the breadth of available knowledge within platform 102. For example, not only can the platform 102 provide the credit worthiness of a buyer, it can also provide the buyer's credit history within the platform itself. The platform 102 can provide an assessment of the buyer's current credit obligations, such as determining if a buyer has used a significant portion of its available credit. The platform 102 may also provide information about the credit providers 112-116, as well as information about the vendor 104. For example, the platform 104 may be able to readily determine how often the vendor is timely in producing goods or fulfilling obligations under a purchase order. The securitization SPV 122 can utilize the non-publicly available information to more accurately standardize the receivable accounts, allowing for the proper purchasing and subsequent trading of accounts by the trustees or other investors.

At time of payment, the servicing device 120 may thereupon forward the payment 148 to the vendor 104. Based on the relationship between the vendor 104 and the SPV 122, the payment is then forwarded directly to the SPV 122. The SPV 122 may then settle the accounts with the trustee 124, concluding the investment transaction.

In another embodiment, the system 100 may include a liquidity facility (not shown) that provides protection for the trade receivable securitization SPV 122. The liquidity facility may be a financial institution or other financial entity that provides liquidity in the event of the buyer's failure to pay and in the unlikely event of credit protection providers refusal or inability to pay.

The apparatus for generating a tradable security, as described above, or one or more various processing components, may also provide for the methodology of generating a tradable security, where the tradable security is associated with a receivable account in a commercial transaction.

Figure 2:
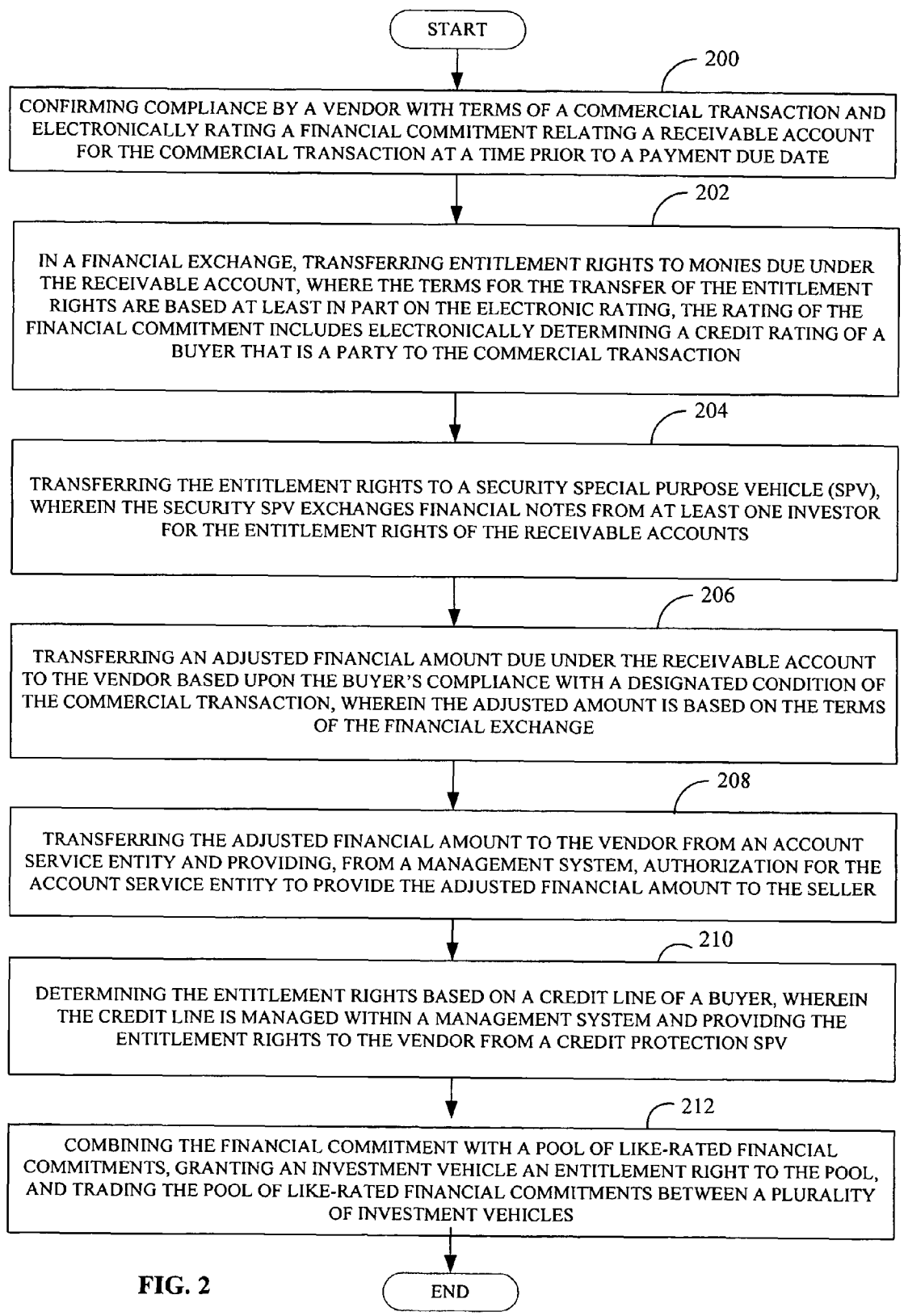
FIG. 2 illustrates a flowchart of the steps of one embodiment of a method for generating a tradable security.

FIG. 2 illustrates a flowchart of one or more embodiments of a method for generating a tradable security. In one embodiment, a first step, step 200 includes confirming compliance by a vendor with terms of a commercial transaction. As described above, the compliance engine of the central platform 102 may evaluate the various steps by the vendor in the execution of the commercial transaction and thereby determine if the vendor has complied with the terms of the transaction, such that the buyer may be obligated to make a due payment. The step 200 further includes electronically rating a financial commitment relating a receivable account for the commercial transaction at a time prior to a payment due date. The processing of rating the financial commitment may be accomplished based on the breadth of available system knowledge. The rating of the financial commitment may be based on various contract factors and the associated parties, such as the creditworthiness of the buyer, the reliability of the vendor, the type of item being contracted as examples of various factors, whereas there exists many additional factors as recognized by one having ordinary skill in the art in generating the rating of the financial commitment.

In the next step, step 202, a financial exchange provides for transferring entitlement rights to monies due under the receivable account, where the terms for the transfer of the entitlement rights are based at least in part on the electronic rating. This step may include the financial exchange working in conjunction with various processing components, such as accounting applications or other types of data storage components. The transfer of entitlement rights may include updating a data field in designated location indicating to whom final payment should be properly processed. In one embodiment, further in step 202, the terms of the entitlement rights may be based at least in part on the electronic rating where the rating of the financial commitment may include electronically determining a credit rating of a buyer that is a party to the commercial transaction.

In one embodiment, the next step, step 204, may include transferring the entitlement rights to a security SPV, wherein the security SPV exchanges financial notes from at least one investor for the entitlement rights of the receivable accounts. Through this operation, the investor purchases the right to be entitled to future payments upon conclusion of the contract. One embodiment of step 204 may further include the financial notes are received through a trustee, such as for example wherein a plurality of investors may pool financial resources and through a central trustee purchase these entitlement rights. The transfer of entitlement rights may further include the additional benefit of credit protection associated with the commercial transaction, which may be provided from a credit protection SPV, as described above with respect to FIG. 1.

In one embodiment, the next step, step 206, may include transferring an adjusted financial amount due under the receivable account to a vendor based upon the buyer's compliance with a designated condition of the commercial transaction, wherein the adjusted amount is based on the terms of the financial exchange. In this embodiment, the vendor receives the proper payment for completion of the terms of the underlying contract. This financial amount may be an adjusted financial amount based on various contract terms, such as offering a reduced payment ahead of a scheduled payment period or in another example, a premium payment for a period time after a normal net payment time period.

In one embodiment, the next step, step 208, may include transferring the adjusted financial amount to the vendor from an account service entity and providing, from a management system, authorization for the account service entity to provide the adjusted financial amount to the vendor. The account service entity may include one or more processing devices operative to perform various platform settlement operations, as described above with respect to FIG. 1.

In another embodiment, the next step, step 210, may include determining the entitlement rights based on a credit line of a buyer, wherein the credit line is managed within a management system and providing the entitlement rights to a vendor from a credit protection SPV. This embodiment may further include the credit protection SPV providing entitlement rights from at least one credit provider such that the entitlement rights include credit protection rights. Therein, the credit protection rights may be transferred to a security SPV prior the completion of the commercial transaction.

In another embodiment, the next step, step 212, may include combining the financial commitment with a pool of like-rated financial commitments, granting investment vehicle entitlement rights to the pool and thereby allowing for the trading of the pool of like-rated financial commitments between various investment vehicles. Thereupon, in one embodiment, the method is complete.

These account receivables are made into viable tradable instruments for one or more investment parties. The financial exchange, through a central processing of the various factors and components, such as those relating to the commercial transaction, obtains a unique perspective on the terms and conditions of the commercial transaction. From this perspective, the commercial transaction can be effectively rated. This rating thereby allows for the integration of like-rated receivable account and facilitates the active tradability of these instruments, including not only the front end processing components for the generation of the commercial transaction, but also the active management of the conditions and activities of the parties to the transaction, but further also to the conclusion activities, including settling accounts and payments between various parties, such as buyers, vendors and investors upon contract completion and the expiration of net term time periods.

Although the preceding text sets forth a detailed description of various embodiments, it should be understood that the legal scope of the invention is defined by the words of the claims set forth in a non-provisional application. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should be understood that there exist implementations of other variations and modifications of the invention and its various aspects, as may be readily apparent to those of ordinary skill in the art, and that the invention is not limited by specific embodiments described herein. It is therefore contemplated to cover any and all modifications, variations or equivalents that fall within the scope of the basic underlying principals disclosed and claimed herein.

What is claimed is:

1. A computer-implemented method for generating a tradable security, the method comprising:
    by a processor, confirming compliance by a vendor with terms of a commercial transaction between the vendor and a buyer;
    electronically rating a financial commitment relating to an account receivable held by the vendor at a time prior to a payment due date for the account receivable, the account receivable resulting from compliance by the vendor with the terms of the commercial transaction and representing a debt due to the vendor subsequent to the compliance with the terms of the commercial transaction; and
    in a computer-implemented financial exchange, transferring entitlement rights to at least a portion of the debt due under the account receivable, where the terms for the transfer of the entitlement rights are based at least in part on the electronic rating of the financial commitment relating to the account receivable.

2. The method of claim 1, wherein the rating of the financial commitment includes electronically determining a credit rating of a buyer that is a party to the commercial transaction.

3. The method of claim 1 further comprising:
    transferring the entitlement rights to a security special purpose vehicle (SPV), wherein the security SPV exchanges financial notes from at least one investor for the entitlement rights.

4. The method of claim 3 wherein the financial notes are received through a trustee representing the at least one investor.

5. The method of claim 3 further comprising:
    transferring the entitlement rights prior to the completion of the commercial transaction, such that the security SPV receives an assignment of a credit protection from a credit protection SPV.

6. The method of claim 1 further comprising:
    transferring an adjusted financial amount due to the vendor based upon the buyer's compliance with a designated condition of the commercial transaction, wherein the adjusted amount is based on the terms of the financial exchange.

7. The method of claim 6 further comprising:
    transferring the adjusted financial amount to the vendor from an account service entity and providing, from a management system, authorization for the account service entity to provide the adjusted financial amount to the vendor.

8. The method of claim 1 further comprising:
    determining the entitlement rights based on a credit line of a buyer, wherein the credit line is managed within a management system; and
    providing the entitlement rights to the vendor from a credit protection special purpose vehicle (SPV).

9. The method of claim 8 wherein the credit protection SPV provides entitlement rights from at least one credit provider, such that the entitlement rights are credit protection rights and the method further includes transferring the credit protection to a security SPV prior to the completion of the commercial transaction.

10. The method of claim 9 further comprising:
combining the financial commitment with a pool of like-rated financial commitments and granting an investment vehicle an entitlement right to the pool, wherein the investment vehicle may be at least one investors.

11. The method of claim 10 further comprising:
trading the pool of like-rated financial commitments between a plurality of investment vehicles.

12. An apparatus for generating a tradable security, the apparatus comprising:
a processing device, in response to executable instructions, operative to confirm compliance by a vendor with terms of a commercial transaction between the vendor and a buyer, and electronically rate a financial commitment relating to an account receivable at a time prior to a payment due date for the account receivable, the account receivable resulting from compliance by the vendor with the terms of the commercial transaction and representing a debt due to the vendor subsequent to the compliance with the terms of the commercial transaction; and
a financial exchange operative to transfer entitlement rights to at least a portion of the debt due under the account receivable, where the terms for the transfer of the entitlement rights are based at least in part on the electronic rating.

13. The apparatus of claim 12, wherein the rating of the financial commitment includes the processing device further operative to electronically determine a credit rating of a buyer that is a party to the commercial transaction.

14. The apparatus of claim 12 wherein the financial exchange is further operative to transfer the entitlement rights to a security special purpose vehicle (SPV), wherein the security SPV exchanges financial notes from at least one investor for the entitlement rights.

15. The apparatus of claim 14 wherein the financial notes are received through a trustee representing the at least one investor.

16. The apparatus of claim 14 wherein the financial exchange is further operative to transfer the entitlement rights prior to the completion of the commercial transaction, such that the security SPV receives an assignment of a credit protection from a credit protection SPV.

17. The apparatus of claim 12 wherein the financial exchange is further operative to transfer an adjusted financial amount due to the vendor based upon the buyer's compliance with a designated condition of the commercial transaction, wherein the adjusted amount is based on the terms of the financial exchange.

18. The apparatus of claim 17 wherein the financial exchange is further operative to transfer the adjusted financial amount to the vendor from an account service entity and provide, from a management system, authorization for the account service entity to provide the adjusted financial amount to the vendor.

19. The apparatus of claim 12 further comprising:
the processing device operative to determine the entitlement rights based on a credit line of a buyer, wherein the credit line is managed within a credit management system; and
the financial exchange further operative to provide the entitlement rights to the vendor from a credit protection special purpose vehicle (SPV).

20. The apparatus of claim 19 wherein the credit protection SPV is operative to provide entitlement rights from at least one credit provider, such that the entitlement rights are credit protection rights and the method further includes transferring the credit protection to a security SPV prior to the completion of the commercial transaction.

21. The apparatus of claim 20 wherein the financial exchange is further operative to:
combine the financial commitment with a pool of like-rated financial commitments and grant an investment vehicle an entitlement right to the pool, wherein the investment vehicle may be at least one investors.

22. The apparatus of claim 21 wherein the financial exchange is further operative to trade the pool of like-rated financial commitments between a plurality of investment vehicles.

23. A computer-implemented method for trading a security, the method comprising:
confirming compliance by a vendor with terms of a commercial transaction between the vendor and a buyer;
electronically rating a financial commitment to pay a debt to satisfy an account receivable held by the vendor at a time prior to a payment due date for the account receivable, including electronically determining a credit rating of a buyer that is a party to the commercial transaction, the account receivable resulting from compliance by the vendor with the terms of the commercial transaction and representing the debt due to the vendor;
in a computer-implemented financial exchange, transferring entitlement rights to at least a portion of the debt due under the account receivable, where the terms for the transfer of the entitlement rights are based at least in part on the electronic rating;
transferring the entitlement rights to a security special purpose vehicle (SPV), prior to the completion of the commercial transaction, wherein the security SPV exchanges financial notes from at least one investor for the entitlement rights; and
transferring an adjusted financial amount due to the vendor based upon the buyer's compliance with a designated condition of the commercial transaction, wherein the adjusted amount is based on the terms of the financial exchange.

24. The method of claim 23 wherein the financial notes are received through a trustee representing the at least one investor.

25. The method of claim 23 wherein the security SPV receives an assignment of a credit protection from a credit protection SPV.

26. The method of claim 25 further comprising:
transferring the adjusted financial amount to the vendor from an account service entity and providing, from a management system, authorization for the account service entity to provide the adjusted financial amount to the vendor.

27. The method of claim 23 further comprising:
determining the entitlement rights based on a credit line of a buyer, wherein the credit line is managed within a management system; and
providing the entitlement rights to a vendor from a credit protection special purpose vehicle (SPV).

28. The method of claim 27 wherein the credit protection SPV provides entitlement rights from at least one credit provider, such that the entitlement rights are credit protection rights and the method further includes transferring the credit protection to a security SPV prior to the completion of the commercial transaction.

29. The method of claim 28 further comprising:

combining the financial commitment with a pool of like-rated financial commitments; granting an investment vehicle an entitlement right to the pool, wherein the investment vehicle may be at least one investors; and trading the pool of like-rated financial commitments between a plurality of investment vehicles.

* * * * *